(12) United States Patent
Wang et al.

(10) Patent No.: US 7,800,824 B2
(45) Date of Patent: Sep. 21, 2010

(54) METHOD FOR DESIGNING GRATINGS

(75) Inventors: Shih Chun Wang, Kaohsiung County (TW); Yi Sha Ku, Hsinchu (TW); Chun Hung Ko, Changhua County (TW); Deh Ming Shyu, Miaoli County (TW); Nigel Smith, Hsinchu (TW)

(73) Assignees: Industrial Technology Research Institute, Hsinchu County (TW); Accent Optical Technologies, Inc., Bend, OR (US)

( * ) Notice: Subject to any disclaimer, the term of this patent is extended or adjusted under 35 U.S.C. 154(b) by 472 days.

(21) Appl. No.: 11/774,402

(22) Filed: Jul. 6, 2007

(65) Prior Publication Data

US 2008/0013176 A1    Jan. 17, 2008

(30) Foreign Application Priority Data

Jul. 12, 2006 (TW) .............................. 95125397 A (51) Int. Cl.
G02B 5/18 (2006.01)
G02B 27/44 (2006.01)

(52) U.S. Cl. ...................................... 359/566; 359/900

(58) Field of Classification Search ......... 359/566–576, 359/900; 356/625
See application file for complete search history.

(56) References Cited

U.S. PATENT DOCUMENTS

| 6,785,638 | B2 * | 8/2004 | Niu et al. ..................... 702/189 |
| 2006/0117293 | A1 | 6/2006 | Smith et al. |
| 2006/0146347 | A1 * | 7/2006 | Smith et al. ................. 356/625 |

* cited by examiner

*Primary Examiner*—Alessandro Amari
(74) *Attorney, Agent, or Firm*—WPAT, P.C.; Anthony King (57) ABSTRACT

A method for designing a grating comprises steps of (a1) generating a first diffraction spectrum based on calculation values of a plurality of structural parameters, (a2) calculating a first difference value between the first diffraction spectrum and a first nominal spectrum, (a3) setting a default difference value with the first difference value and default structural parameter values with the structural parameter values, (b1) changing one of the structural parameter values to generate a second diffraction spectrum, (b2) calculating a second difference value between the second diffraction spectrum and a second nominal spectrum, and (c) comparing the default difference value and the second difference value, updating a default difference value with the smaller one, and updating the default structural parameter values with the structural parameter values corresponding to the smaller one.

9 Claims, 9 Drawing Sheets

METHOD FOR DESIGNING GRATINGS

BACKGROUND OF THE INVENTION (A) Field of the Invention

The present invention relates to a method for designing gratings, and more particularly, to a method for designing gratings by using an optimization algorithm to select structural parameters to design gratings.

(B) Description of the Related Art

The capabilities of process control play an important role in product yield. According to the International Technology Roadmap for Semiconductor (ITRS) report, the precision requirement for overlay measurement is 3.5 nanometers for a node of 130 nanometers, and 3.2 nanometers for a node of 90 nanometers. As the line width becomes smaller and smaller, the precision requirement for the overlay measurement is 2.3 nanometers for a node of 65 nanometers in the next-generation process. It is very difficult for the conventional bright-field metrology systems to meet the precision requirement due to limitations in image resolution. Scatterometry has good repeatability and reproducibility and is proposed for the overlay measurement on the next-generation process. Consequently, increasing importance is placed on improving the overlay measurement precision based on scatterometry to meet increasingly rigorous precision requirements.

The prior art uses numerical algorithms such as principle component analysis, neural network analysis or interpolation analysis to acquire valuable information from the finite data to increase the comparison accuracy. These analyses considered the measured data to be signal without noise, but the measured data in fact includes irrelevant noise, which influences the data-acquiring accuracy during the subsequent data processing. In particular, the actual fabrication process generally includes process variation, for example, the refractive index of fabrication material deeply depends on the variation of the fabrication condition, and a little variation in the fabrication condition can cause a large variation in the intensity of the diffraction spectrum.

SUMMARY OF THE INVENTION

One exemplary example consistent with the present invention is to provide a method for designing gratings by using an optimization algorithm to select structural parameters to design gratings whereby the influence of the process variation on the intensity of the diffraction spectrums is at a minimum, which can decrease the measurement error originating from the process variation without modifying the hardware structure.

A method for designing gratings according to this example of the present invention comprises the steps of (a1) generating a first diffraction spectrum based on calculation values of a plurality of structural parameters, (a2) calculating a first difference value between the first diffraction spectrum and a first nominal spectrum, (a3) setting a default difference value with the first difference value and default structural parameter values with the structural parameter values, (b1) changing one of the structural parameter values to generate a second diffraction spectrum, (b2) calculating a second difference value between the second diffraction spectrum and a second nominal spectrum, and (c) comparing the default difference value and the second difference value, updating a default difference value with the smaller one, and updating the default structural parameter values with the structural parameter values corresponding to the smaller one.

Another exemplary example consistent with of the present invention provides a method for designing gratings comprising the steps of (a) selecting a first structural parameter value and a measure angle value to generate a first characteristic value based thereon, and setting a default characteristic value with the first characteristic value, setting a default structural parameter value with the first structural parameter value, and setting a default angle value with the measure angle value, (b) changing the first structural parameter value or the measure angle value to generate a second characteristic value based thereon; and (c) comparing a default characteristic value with the second characteristic value, updating the default characteristic value with the bigger one, updating the default structural parameter value and the default angle value with the first structural parameter value and the measure angle value corresponding to the bigger one. The steps (b) and (c) are repeated at predetermined times, and designing the gratings based on the default structural parameter value and measuring the gratings at the default measure angle value can decrease the measurement error originating from the process variation, i.e., increase the measurement sensitivity.

BRIEF DESCRIPTION OF THE DRAWINGS

The objectives and advantages of the present invention will become apparent upon reading the following description and upon reference to the accompanying drawings in which.

DETAILED DESCRIPTION OF THE INVENTION

Figure 1:
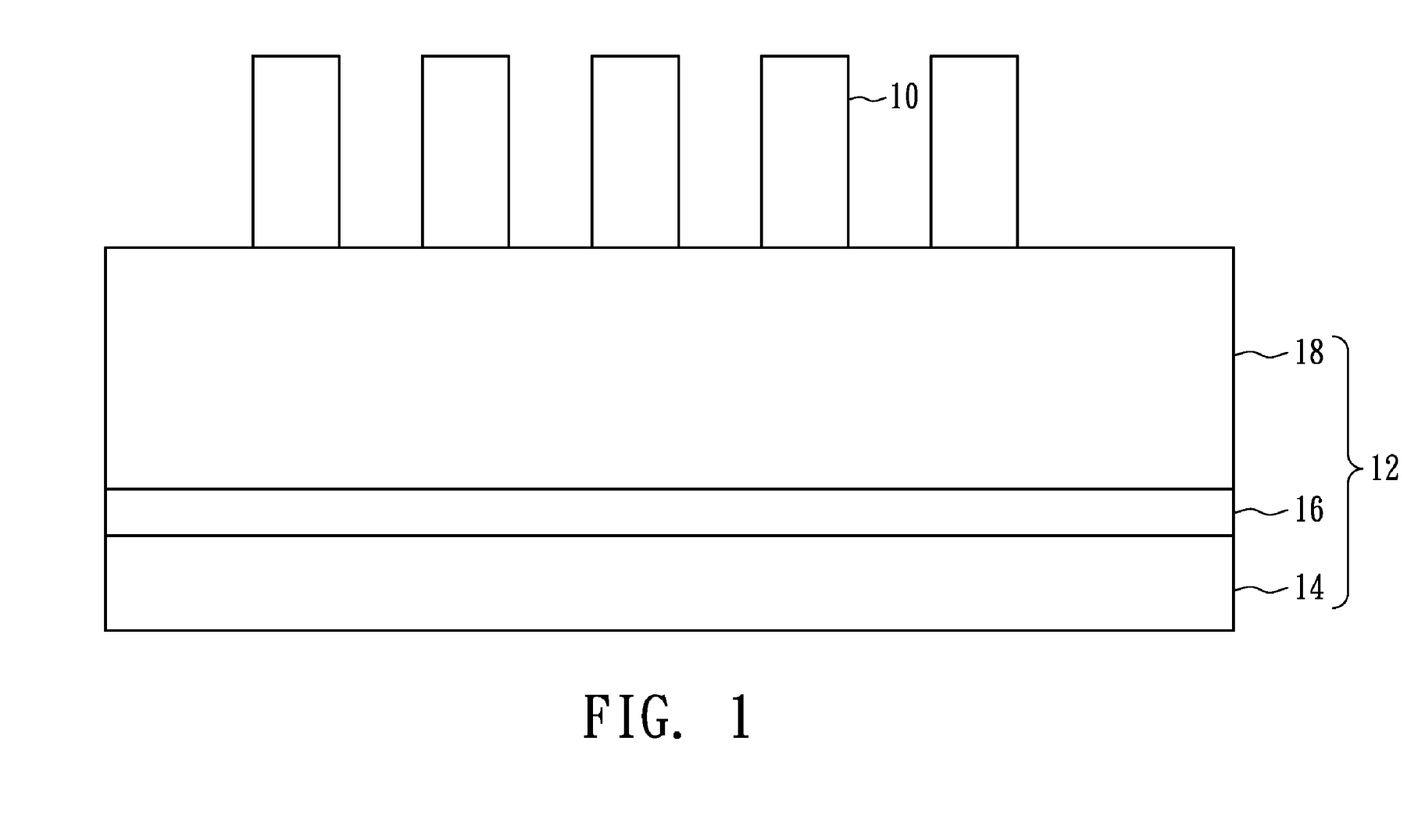
FIG. 1 illustrates the structure of a grating.

FIG. 1 illustrates the structure of a grating 10. The grating 10 is formed on a substrate 12 including a silicon substrate 14, a bottom layer 16 made of silicon oxide and an intermediate layer 18 made of polysilicon, and the grating 10 is made of photoresist material on the surface of the intermediate layer 18. The thickness and the refractive index of the material of each layer are listed in Table I.

TABLE I

| | Material | Thickness | Refractive index |
|---|---|---|---|
| Grating | photoresist | 750 nm | 1.62399 |
| Intermediate layer | polysilicon | 250 nm | 3.925959 |
| Bottom layer | Silicon oxide | 5 nm | 1.462589 |
| Silicon substrate | Silicon | — | 3.866894 |

Figure 2:
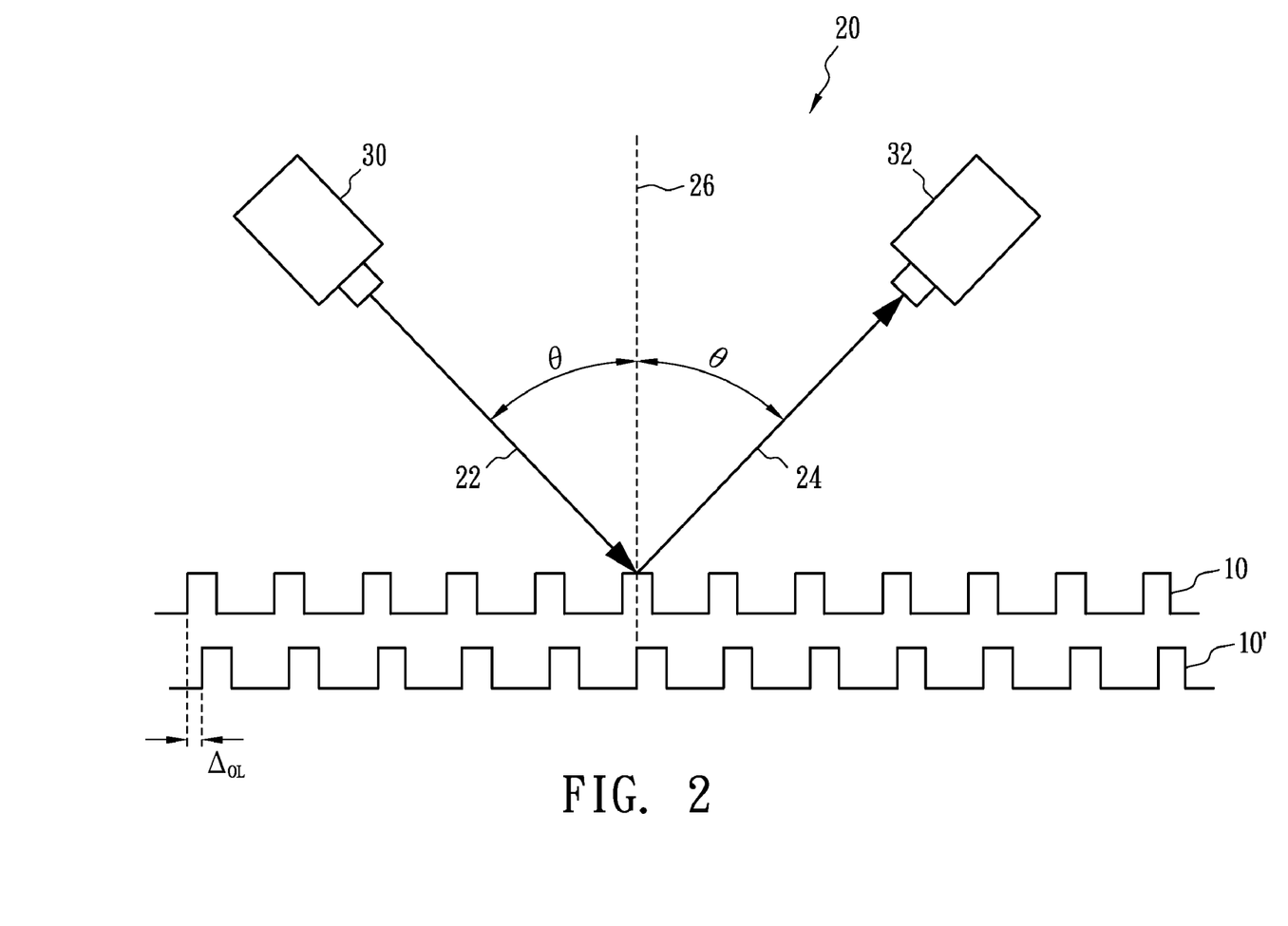
FIG. 2 illustrates the system architecture of an angular scatterometer.

FIG. 2 illustrates the system architecture of an angular scatterometer 20, which is applied to measuring the diffraction spectrums of two gratings 10, 10' having an overlay error ($\Delta_{OL}$). Although the Angular Scatterometer is used as one embodiment of the present invention hereinafter, the present invention can also be applied to a spectroscopic reflectometer and a specular spectroscopic ellipsometer with multiple wavelength and single angle incident light. The angular scatterometer 20 uses an (2-θ) optical system architecture adopting an incident laser having a single wavelength and scanning in multiple angles. The angle between an incident light 22 from a laser source 30 and the normal 26 is the same as that between a diffraction light 24 and the normal 26, and a light detector 32 only receives the diffraction light of zero-order. The laser source 30 can be a widely used laser including the argon ion laser (having the wavelength of 488 nm and 514 nm), the helium-cadmium laser (having the wavelength of 442 nm), the helium-neon laser (having the wavelength of 612 nm and 633 nm) and the Nd:YAG laser (having the wavelength of 532 nm). A diffraction spectrum, also referred to as a signature, of the angle of the incident light and the intensity of the diffraction light can be obtained by changing the incident angle θ. More particularly, the diffraction spectrum is a polarized light diffraction spectrum, such as an S-polarized light diffraction spectrum or a P-polarized light diffraction spectrum.

Figure 3:
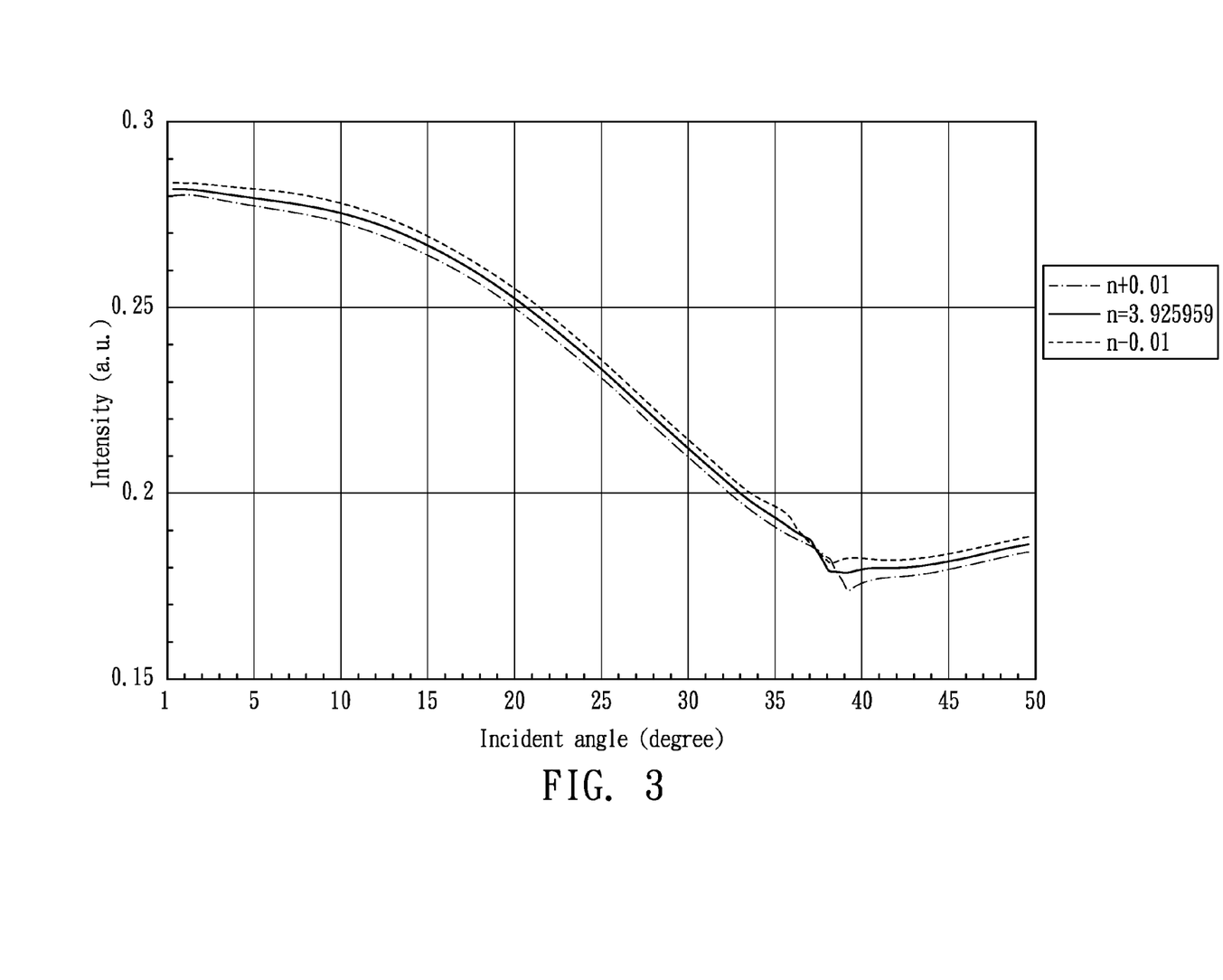
FIG. 3 shows a plurality of diffraction spectrums measured by an angular scatterometer.

FIG. 3 shows a plurality of diffraction spectrums measured by an angular scatterometer, wherein the line width and the pitch of the gratings 10 are the same, but the polysilicon of the intermediate layer 18 has different refractive indexes. As shown in FIG. 3, even if the line width and the pitch of the gratings 10 are the same, the shapes of the diffraction spectrums are different due to the influence of the refractive index of the polysilicon, and the refractive index of the polysilicon is greatly affected by process control parameters such as the temperature and the pressure of a reaction chamber. In other words, the diffraction spectrum measured by the angular scatterometer is not only affected by the line width and the pitch of the grating 10, but also indirectly affected by the parameters of the reaction process, which should be reduced as much as possible to obtain an accurate measurement result.

Figure 4:
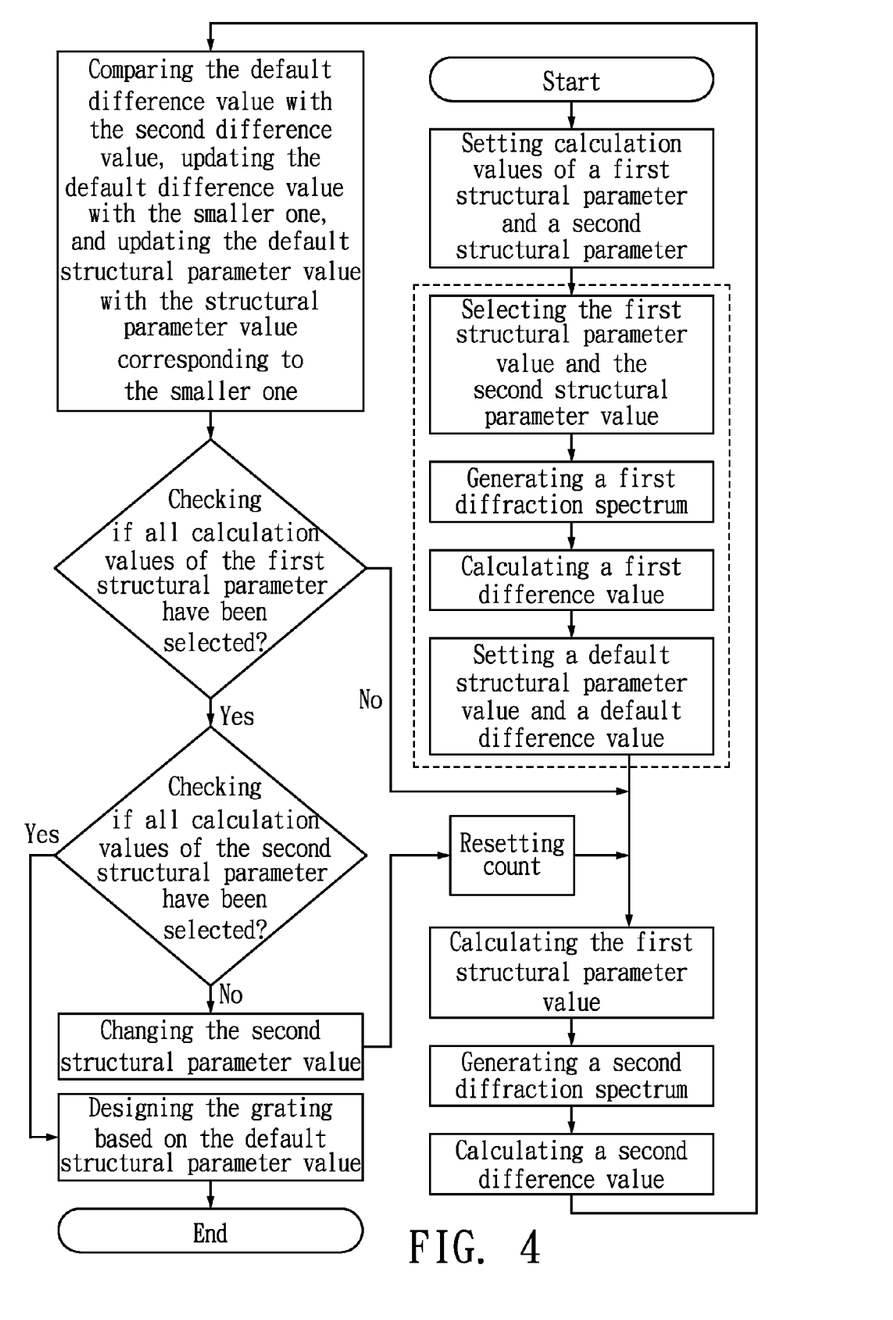
FIG. 4 is a flow chart for designing a grating according to one embodiment of the present invention.

FIG. 4 is a flow chart for designing a grating according to one embodiment of the present invention. A database having a plurality of standard diffraction spectrums is established first. The plurality of standard diffraction spectrums can be obtained by calculating with the simulation software, or by practically preparing the grating 10 as shown in FIG. 1 and measuring with the angular scatterometer. The line-to-space (line/space) ratio of the standard diffraction spectrums is between 0.1 and 0.9, the pitch is between 0.2 μm and 2.0 μm, and the refractive index of the polysilicon is the standard value of 3.925959.

The calculation values of the line/space ratio (the first structural parameter in the description of this embodiment) and the pitch (the second structural parameter in the description of this embodiment) are set. For example, the calculation value of the line/space ratio is set between 0.1 and 0.9 with an increment being 0.01, and the calculation value of the pitch is set between 0.2 μm and 2.0 μm with an increment being 100 nm. Then, the calculation values of the line/space ratio and the pitch are selected (for example, the calculation value of the line/space ratio is selected as 0.1 and the calculation value of the pitch is selected as 0.2), and a first diffraction spectrum is generated using the rigorous coupled wave theory (RCWT), wherein the refractive index of the polysilicon (set as the third structural parameter) is different from the standard value (for example, the refractive index of the polysilicon is set to a standard value +0.01 or −0.01). In addition, the initial value of the count is set to 0. More particularly, the technology of establishing a simulated diffraction spectrum with the RCWT can refer to the U.S. patent application Ser. No. 11/288,834 submitted by the present inventor on 28 Nov. 2005.

A first difference value is calculated from the first diffraction spectrum and a first nominal spectrum, wherein the first nominal spectrum is retrieved from the standard diffraction spectrums in the previously established database and has the same line width and pitch as that of the first diffraction spectrum, but the polysilicon has a different refractive index (with a difference of +0.01 or −0.01). Preferably, the first difference values between the first diffraction spectrum and the first nominal spectrum can be quantitatively calculated by the root-mean-square error (RMSE). The RMSE is defined as:

$$RMSE = \sqrt{\frac{\sum_{i=1}^{N}(x_i - y_i)^2}{N}}$$

x and y stand for the diffraction light intensities of the first diffraction spectrum and the first nominal spectrum, and N stands for the sampling points of each spectrum. Then, the line/space ratio value (0.1) and the pitch value (0.2) are set as a default structural parameter value and the first difference value is set as a default difference value.

The value of the count is updated (count=count+1=0+1=1) and the calculation value of the line/space ratio is calculated, for example, the line/space ratio is calculated to 0.1+0.01 (increment)×count=0.1+0.01×1=0.11, and a second diffraction spectrum is generated by RCWT. Then, a second difference value is calculated from the second diffraction spectrum and a second nominal spectrum, wherein the second nominal spectrum is retrieved from the standard diffraction spectrums in the previously established database and has the same line width and pitch as that of the second diffraction spectrum, but the polysilicon has a different refractive index.

The default difference value is compared with the second difference value, the smaller one is stored as a default difference value, and the structural parameter value corresponding to the smaller one is stored as a default structural parameter value. Then, whether all the calculation values of the line/space ratio are selected is checked. If the result is "no", the value of the count is updated (count=count+1=1+1=2) and the calculation value of the line/space ratio is calculated correspondingly, then another second diffraction spectrum is generated by RCWT, and the second difference value is calculated according to the second diffraction spectrum and the corresponding standard diffraction spectrum in the database. If the result is "yes", whether all the calculation values of the pitch are selected is checked.

If the pitch still has calculation values that are not selected, the calculating value of the pitch is changed (for example, the pitch is changed to 0.2+0.01=0.21), and the count is reset to the initial value (0) to perform the above calculation procedure. If all the calculation values of the pitch are selected, the default difference value is the minimum one, and the grating structure (i.e., line/space ratio and pitch) corresponding to the default structural parameter value is most insensitive to the variation of the refractive index of polysilicon, that is, the variation of the refractive index of polysilicon has a minimum influence on the diffraction light intensity of the grating 10. Therefore, using the default structural parameter value to design the grating 10, the influence of the variation of the refractive index of polysilicon on the diffraction light intensity of the grating 10 can be reduced to the minimum.

Figure 5:
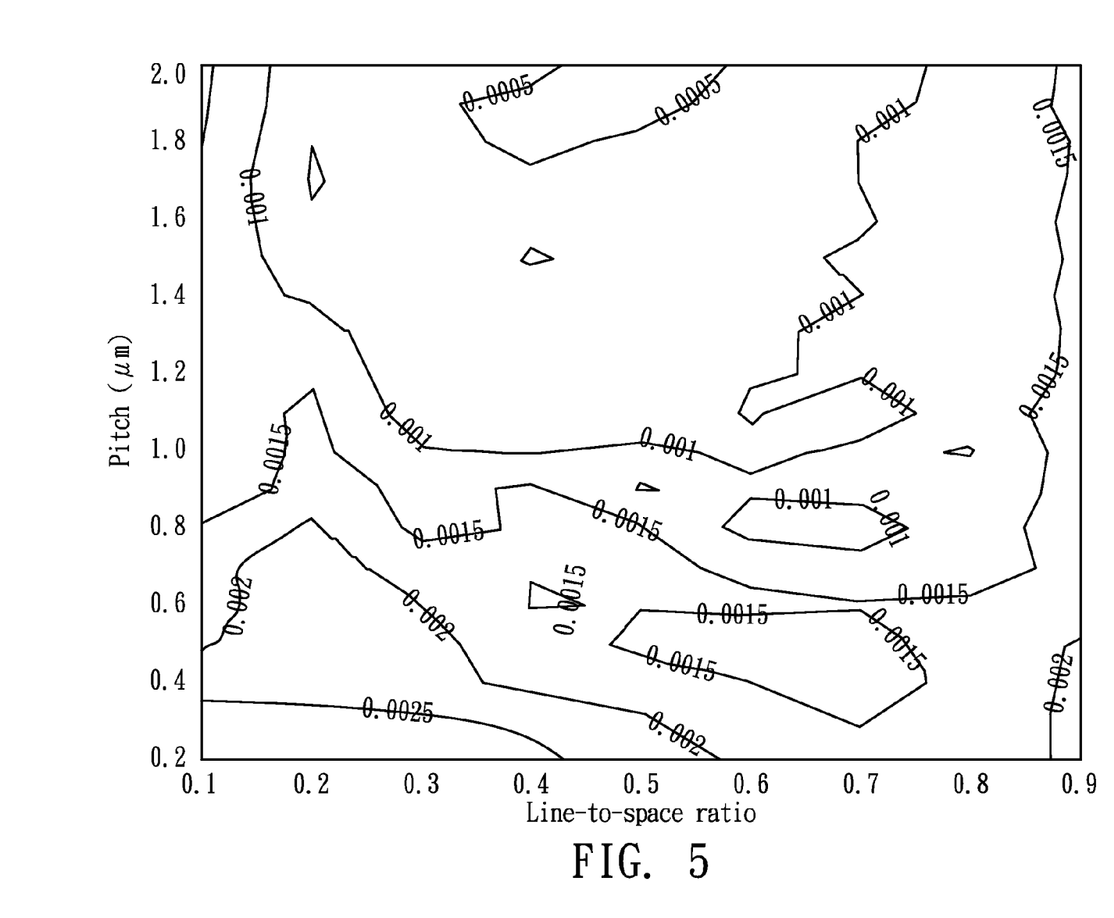
FIG. 5 is a RMSE contour chart of the calculation result in FIG. 4.

FIG. 5 is a RMSE contour chart of the calculation result in FIG. 4. As shown in FIG. 5, when the line/space ratio is 0.5, the corresponding RMSE value will decrease with the increasing pitch of the grating 10. When the pitch of the grating increases from 0.2 μm to 2.0 μm, the influence of the refractive index of polysilicon on the diffraction spectrum is reduced from 0.002 to 0.0005, i.e., the influence of the refractive index of polysilicon is reduced down to ¼. More particularly, besides the refractive index of polysilicon, the refractive index of other film layers can be used as the third structural parameter of the above calculation process. Moreover, the above structural parameter also can be the thickness, sidewall angle, or overlay error of the alignment mark of the grating or the extinction coefficient of the material.

Table II and Table III show the influence of the refractive index of polysilicon on different gratings, wherein the standard value of the refractive index is set to 3.925959. Assuming that the grating structure has a line width of 1000 nm and the refractive index of polysilicon varies by ±10% of the standard value and the influence of the refractive index of the polysilicon is not taken into consideration, the matched line width of the standard diffraction spectrum from the database is 993 nm, which has a comparison error of 7 nm with the real line width of 1000 nm, as shown in Table II. The matched line width is determined based on the RMSE value of the measured diffraction spectrum and the standard diffraction spectrum (the line width is 1000 nm, the pitch of the grating is 2000 nm, and the standard value of the refractive index is set to 3.925959, assuming the refractive index of the polysilicon under the grating is 3.925959 and the difference of the standard diffraction spectrum is caused only by the variation of the line width).

TABLE II

| Pitch of Grating = 2000 nm; Line Width = 1000 nm | | | | | | | |
|---|---|---|---|---|---|---|---|
| Refractive index of polysilicon | n − 10% | n − 0.1 | n − 0.01 | Standard value | n + 0.01 | n + 0.1 | n + 10% |
| RMSE | 0.003571 | 0.001098 | 0.003545 | 0 | 0.00368 | 0.001667 | 0.003373 |
| Matching line width (nm) | 999 | 1000 | 1001 | 1000 | 1001 | 1000 | 993 |
| Comparison error (nm) | 1 | 0 | 1 | 0 | 1 | 0 | 7 |

Furthermore, as for the grating structure with a line width being 370 nm and a variation of the refractive index of polysilicon being the standard value +10%, if the influence of the refractive index of polysilicon is not taken into consideration, a matched line width of the standard diffraction spectrum from the database based on the RMSE value is 357 nm, which has a comparison error of 13 nm with the real line width of 370 nm, as shown in Table III.

TABLE III

| Pitch of Grating = 740 nm; Line Width = 370 nm | | | | | | | |
|---|---|---|---|---|---|---|---|
| Refractive index of polysilicon | n − 10% | n − 0.1 | n − 0.01 | Standard value | n + 0.01 | n + 0.1 | n + 10% |
| RMSE | 0.007506 | 0.00849 | 0.017085 | 0 | 0.017012 | 0.007467 | 0.022313 |
| Matching line width (nm) | 360 | 370 | 362 | 370 | 362 | 367 | 357 |
| Comparison error (nm) | 10 | 0 | 8 | 0 | 8 | 7 | 13 |

In summary, the process variation causes different refractive indexes of materials, which will further result in a line width measurement error. The method for designing a grating according to the present invention uses an optimization algorithm to find a grating structural parameter having a minimum influence of the refractive index of the material (i.e., the minimum process influence), and designs a grating based on the grating structural parameter, which can reduce the measurement error generated by the process variation and increase the measurement sensitivity without changing the hardware architecture of the measurement device.

Figure 6:
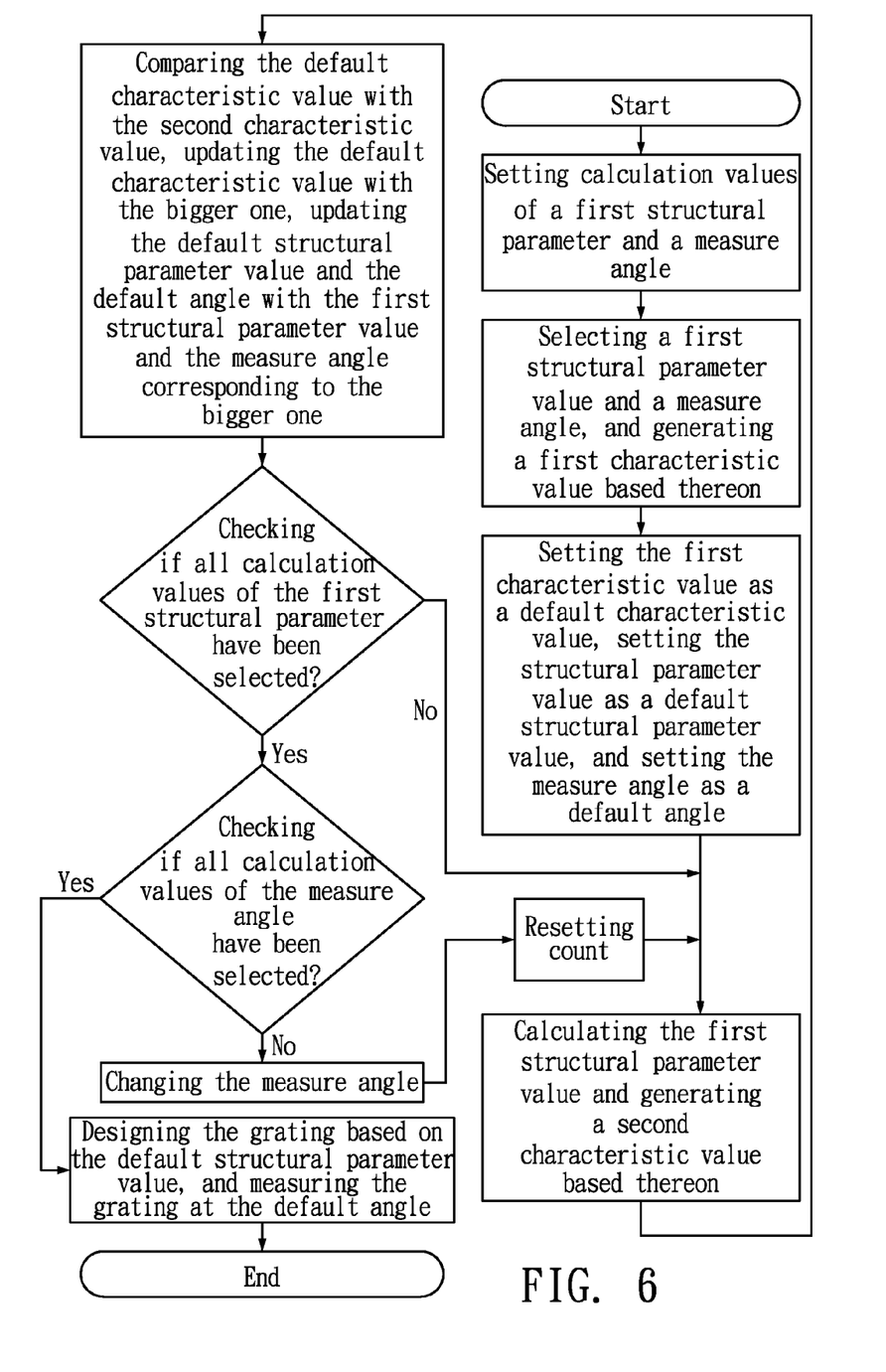
FIG. 6 illustrates a flow chart for designing a grating according to another embodiment of the present invention.

FIG. 6 illustrates a flow chart for designing a grating according to another embodiment of the present invention. For example, the first structural parameter is pitch in the description of this embodiment and the initial value of the count is set to 0. For example, the range of the pitch is between 65 nm and 1000 nm with an increment of 9.35 nm. A pitch value (65 nm) and a measuring angle (0 degrees) are selected to generate a first characteristic value (for example, the intensity value of the diffraction light) based thereon, and then the first characteristic value is set as a default characteristic value, the pitch value is set as a default structural parameter value and the measuring angle is set to a default angle.

Next, the value of the count is updated (count=count+1=0+1=1) and the pitch value (or the measuring angle) is calculated to 65+9.35 (increment)×count=65+9.35×1=74.35 to generate a second characteristic value. Then, the default characteristic value is compared with the second characteristic value, the greater one is used to update the default characteristic value, and the pitch value and measuring angle corresponding to the greater one are used to update the default structural parameter value and the default angle.

A checking step is performed to check whether all the calculation values of the pitch are selected. The range of the pitch is between 65 nm and 1000 nm with an increment of 9.35 nm, and thus there are 100 pitch values in total to be calculated. The checking step checks whether all (100) the calculation values are selected. If the checking result is "no", the value of the count is updated (count=count+1=1+1=2) and the pitch value and the calculation value of the pitch is calculated correspondingly, and the above steps are performed.

If the checking result is "yes", another checking step is performed to check whether all the angle values of the measuring angle are selected. For example, the measuring angle is between 0° and 47° with an increment of 1°, thus there are 48 angle values in total to be calculated. The checking step checks whether all (48) the angle values are selected, and if the checking result is "no", another calculation value of the measuring angle (for example the measuring angle of 0+1 (increment)=1) is selected, i.e., the measuring angle is changed, and the count is reset to the initial value (0) and the above steps are performed. If the checking result is "yes", a grating is designed by using the default structural parameter and the grating is measured by using the default angle, and the maximum measurement sensitivity is obtained.

Figure 7:
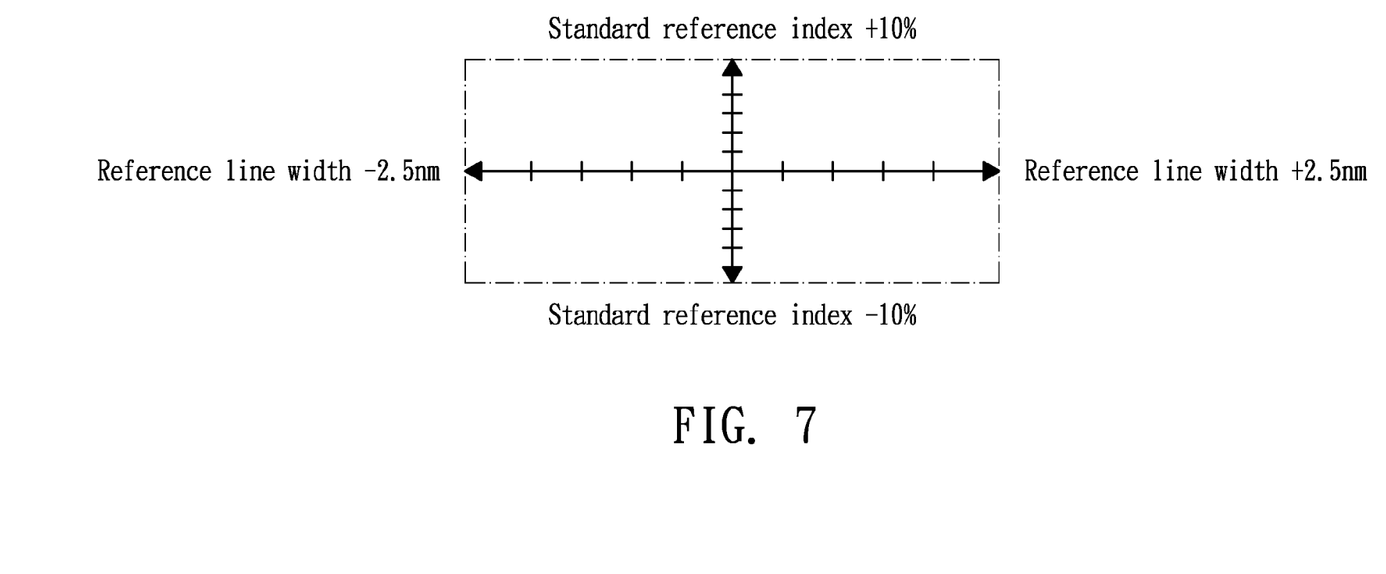
FIGS. 7 to 9 show a method for generating the first characteristic value.
Figure 8:
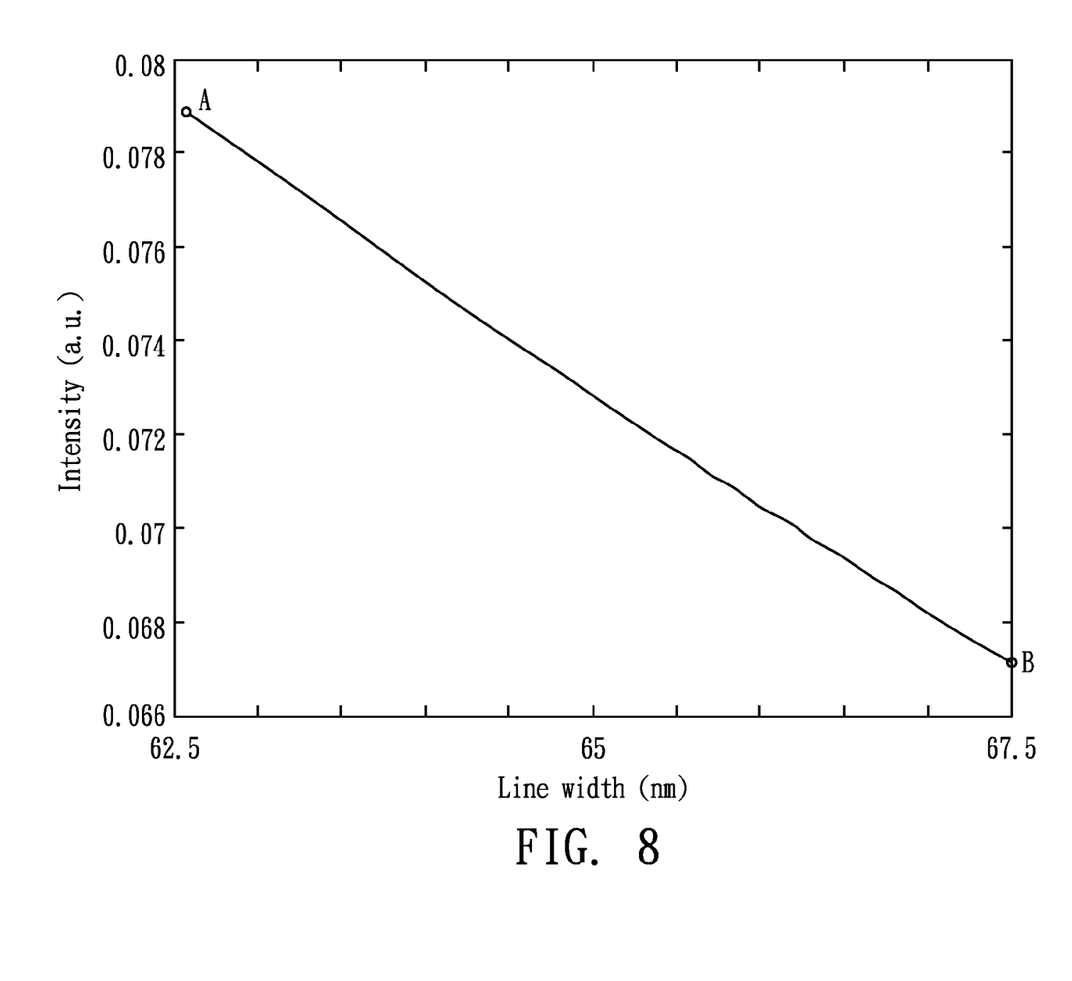
Figure 9:
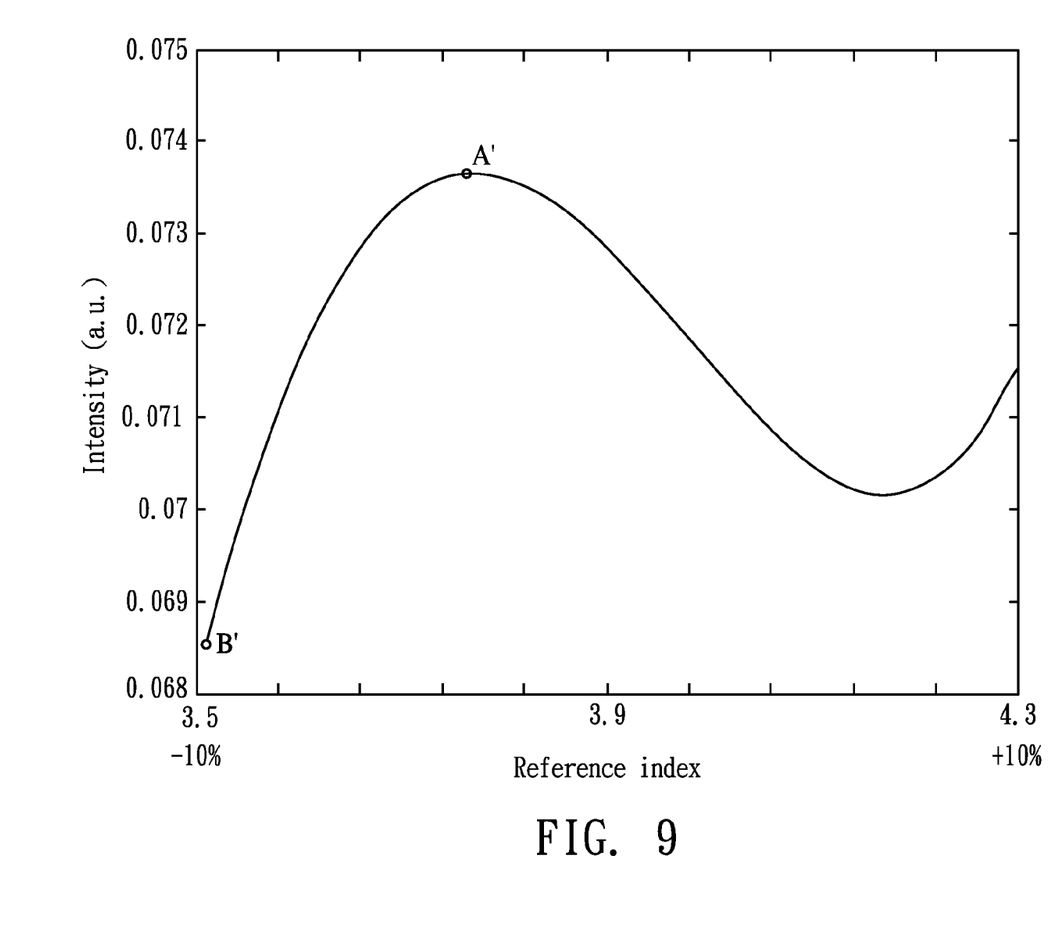

FIGS. 7 to 9 show a method for generating the first characteristic value. The method for generating the first characteristic value (or the second characteristic value) comprises the following steps: n (for example, 10, i.e., the abscissa in FIG. 7 is equally divided into 10 averages) pitch values (for example, the line width of the grating) are selected, and n intensity values of the first diffraction light are generated based thereon, i.e., a variation curve of the diffraction light intensity and the line width under a default third structural parameter value (for example, the refractive index of polysilicon) is generated, as shown in FIG. 8. The intensity value of the diffraction light is obtained by measuring the practically prepared grating of different line widths; in addition, it can be generated by RCWT, which is described in detail in U.S. patent application Ser. No. 11/288,834 submitted by the present inventor on 28 Nov. 2005.

The minimum of n intensity values of the first diffraction light is subtracted from the maximum thereof to generate a pitch variation value (i.e., the intensity difference derived from subtracting point B from point A in FIG. 8). Next, the third structural parameter (i.e., the refractive index of polysilicon) is changed for m times to generate m (for example, 10) third structural parameter variations, i.e., m variation curves of the diffraction light intensity and the line width under a default refractive index (as shown in FIG. 8) are generated, and then the minimum is subtracted from the maximum to generate m pitch variation values.

m third structural parameter values are selected, and m second diffraction intensity values are generated based thereon, i.e., a variation curve of the diffraction light intensity and the refractive index under a default pitch value (i.e., the line width) is generated, as shown in FIG. 9. Next, the minimum of the m second diffracted intensity values is subtracted from the maximum thereof to generate a third structural parameter variation value (i.e., the intensity difference derived form subtracting point B' from point A' in FIG. 9). Then, the pitch is changed n times to generate n third structural parameter variations, i.e., n variation curve of the diffraction light intensity and the refractive index under a default line width (as shown in FIG. 9) are generated, and then the minimum is subtracted from the maximum thereof to generate n third structural parameter variations.

The division of m pitch variation values and n third structural parameter variation values can generate m×n division results (the pitch variation value/the third structural parameter variation value). The design method of the present invention selects the maximum of the m×n division results as the first characteristic value. That is, the 10 third structural parameter variations are divided by the 10 pitch variations to generate 100 division results, and the first characteristic value is obtained by selecting the maximum of the 100 division results. Moreover, the pitch variation value also can be divided by the third structural parameter variation, and the minimum of the m×n division results is selected as the first characteristic value. The plurality of pitch values (the line width values of the grating) is within a range of a predetermined offset (for example 2.5 nm) of a first reference value (for example 65 nm), i.e., between 62.5 nm and 67.5 nm. The plurality of the refractive index values of the polysilicon (the third structural parameter) are within a range of a predetermined percentage (10%) of a second reference value (the standard refractive index of polysilicon being 0.39), i.e., between 3.5 and 4.3. Moreover, the first structural parameter, the second structural parameter and the third structural parameter can be the refractive index (the refractive index of the polysilicon), the pitch of the grating, the line width of the grating, or the overlay error.

The above-described embodiments of the present invention are intended to be illustrative only. Numerous alternative embodiments may be devised by those skilled in the art without departing from the scope of the following claims.

What is claimed is:

1. A method for designing gratings, comprising steps of:
   (a1) generating a first diffraction spectrum based on calculation values of a plurality of structural parameter;
   (a2) calculating a first difference value between the first diffraction spectrum and a first nominal spectrum;

(a3) setting a default difference value with the first difference value and default structural parameter values with the structural parameter values;

(b1) changing one of the structural parameter values to generate a second diffraction spectrum;

(b2) calculating a second difference value between the second diffraction spectrum and a second nominal spectrum; and (c) comparing the first difference value and the second difference value, updating the default difference value with the smaller one, and updating the default structural parameter values with the structural parameter values corresponding to the smaller one.

2. The method for designing gratings according to claim 1, further comprising a step of (d) repeating the steps (b1), (b2) and (c) for predetermined times after the step (c), and designing the gratings based on the default structural parameter values.

3. The method for designing gratings according to claim 1, wherein the first diffraction spectrum and the second diffraction spectrum are generated based on a rigorous coupled wave theory.

4. The method for designing gratings according to claim 1, wherein the first difference value is a root mean square error value between the intensity of the first diffraction spectrum and the intensity of the first nominal spectrum.

5. The method for designing gratings according to claim 1, wherein the second difference value is a root mean square error value between the intensity of the second diffraction spectrum and the intensity of the second nominal spectrum.

6. The method for designing gratings according to claim 1, wherein the structural parameter values include a refractive index, a refractive index of polysilicon, a pitch of the grating, a line width of the grating, or an overlay error.

7. The method for designing gratings according to claim 1, wherein the diffraction spectrums are polarization diffraction spectrums.

8. The method for designing gratings according to claim 7, wherein the diffraction spectrums are s-polarization diffraction spectrums or p-polarization diffraction spectrums.

9. The method for designing gratings according to claim 1, being applied to an angular scatterometer, a reflectometer, or an ellipsometer.

* * * * *